(12) United States Patent
Karunamuni

(10) Patent No.: US 6,196,847 B1
(45) Date of Patent: Mar. 6, 2001

(54) EDUCATIONAL MATHEMATICAL APPARATUS

(76) Inventor: Anura J. Karunamuni, 3147 McCord Blvd., Tallahassee, FL (US) 32303-1723

(*) Notice: Subject to any disclaimer, the term of this patent is extended or adjusted under 35 U.S.C. 154(b) by 0 days.

(21) Appl. No.: 09/203,991

(22) Filed: Dec. 2, 1998

(51) Int. Cl.$^7$ .................................................. G09B 19/02
(52) U.S. Cl. ........................ 434/188; 434/195; 434/191
(58) Field of Search ................... 434/188, 193, 434/195, 204, 191, 209, 198, 199

(56) References Cited

U.S. PATENT DOCUMENTS

| | | |
|---|---|---|
| 1,396,379 | 11/1921 | Moore . |
| 1,694,405 * | 12/1928 | Troidl ................................ 434/195 |
| 2,317,206 * | 4/1943 | Major ................................ 434/195 |
| 2,564,976 * | 8/1951 | Hooper .............................. 434/204 |
| 2,809,443 * | 10/1957 | Hospodar .......................... 434/195 |
| 3,267,590 * | 8/1966 | Browning .......................... 434/195 |
| 3,290,798 | 12/1966 | Gilbert . |
| 3,357,116 | 12/1967 | Bazacos . |
| 3,430,363 * | 3/1969 | Della Gala ........................ 434/204 |
| 3,995,378 * | 12/1976 | Darnell .............................. 434/195 |
| 4,372,742 * | 2/1983 | Wentworth ........................ 434/199 |
| 4,808,111 | 2/1989 | Pratt .................................. 434/191 |
| 4,884,973 * | 12/1989 | Pak ................................... 434/191 |
| 5,040,987 * | 8/1991 | Frazier .............................. 434/188 |
| 5,338,203 * | 8/1994 | Rheams ............................. 434/208 |
| 5,423,682 * | 6/1995 | Hildebrandt ...................... 434/195 |
| 5,688,126 * | 11/1997 | Merritt .............................. 434/128 |
| 5,738,524 * | 4/1998 | Tsao ................................. 434/210 |
| 5,769,639 * | 6/1998 | Foster ............................... 434/159 |
| 5,865,627 * | 2/1999 | Foresman ......................... 434/193 |
| 5,893,718 * | 4/1999 | O'Donnell ........................ 434/128 |

FOREIGN PATENT DOCUMENTS

1483452 * 8/1977 (GB) .................................. 434/193

* cited by examiner

*Primary Examiner*—Jacob K. Ackun
*Assistant Examiner*—K. Fernstrom
(74) *Attorney, Agent, or Firm*—Trinidad K. Dixon

(57) ABSTRACT

The present invention is an apparatus and method of educating the fundamentals of numbers and/or mathematics. The apparatus is designed to replicate mathematical problems appearing on books and other media and includes a base having a front surface. This front surface includes a plurality of recesses, oriented in a column fashion. Each column represents the one's, ten's, and hundred's. The recesses receive numerical plates which are sized according to the specific column. An operator recess for receiving an operator plate is also provided to enable mathematical process to be performed by a user.

20 Claims, 6 Drawing Sheets

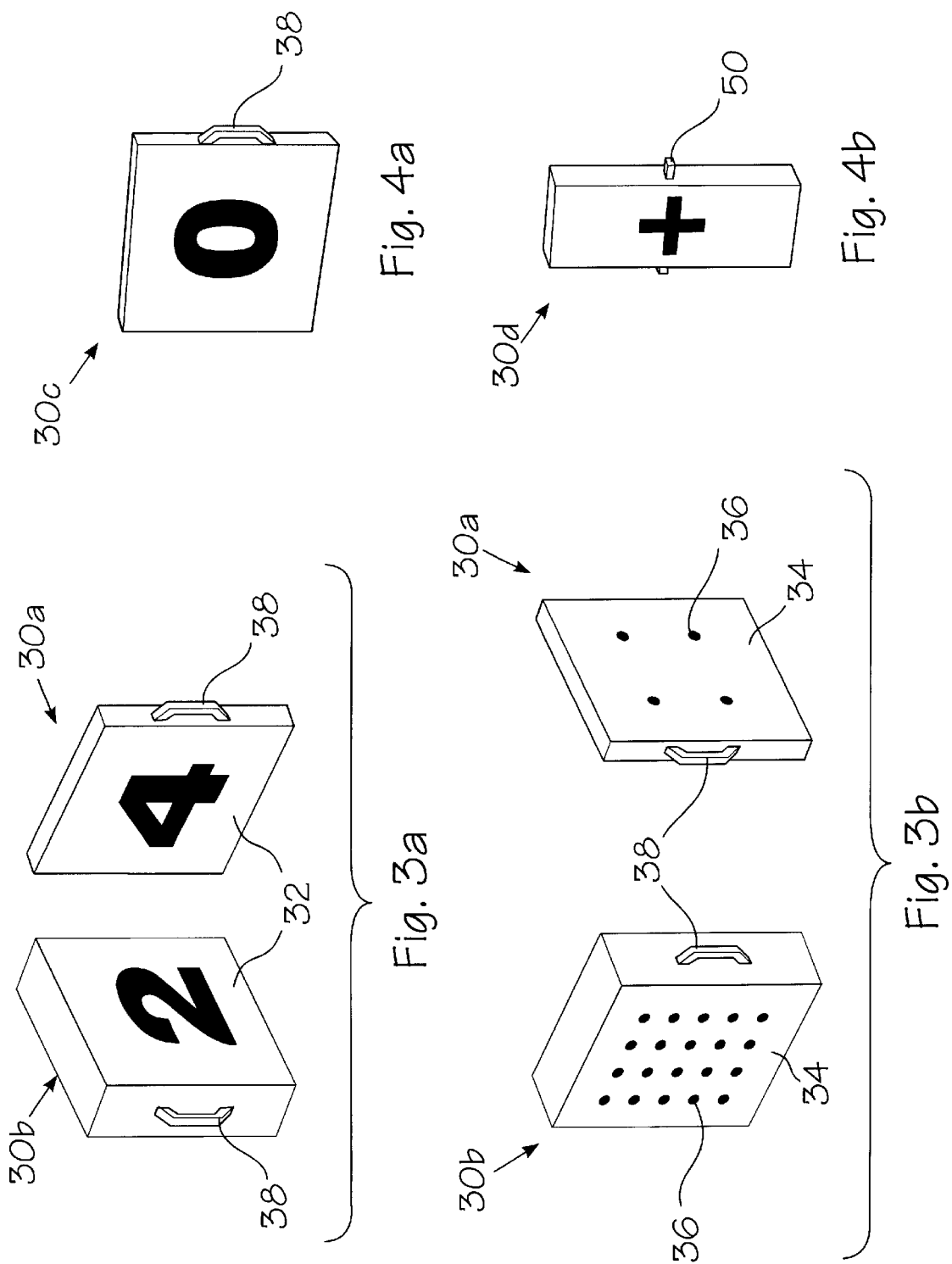

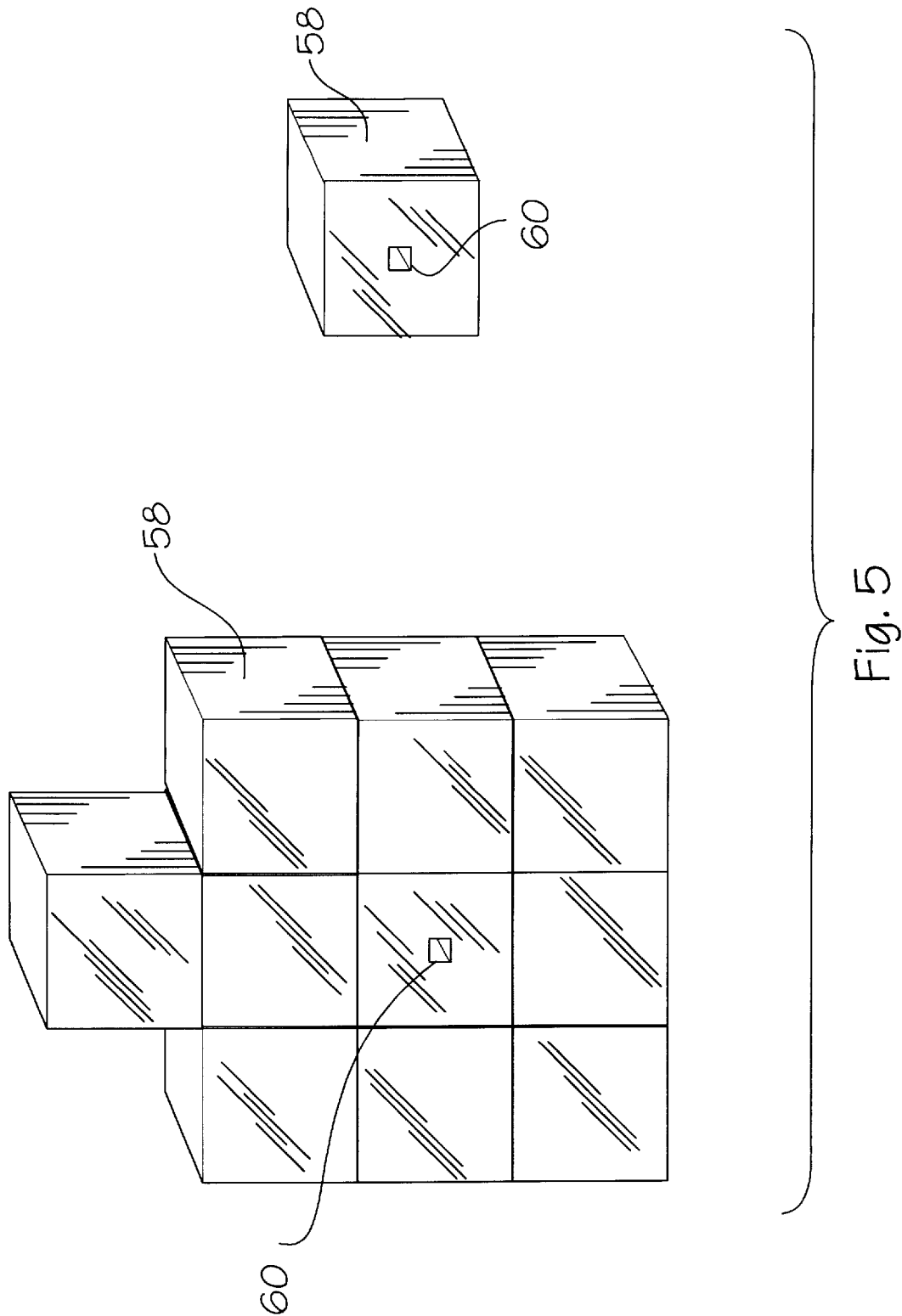

EDUCATIONAL MATHEMATICAL APPARATUS

BACKGROUND OF THE INVENTION

1. Field of the Invention

The present invention relates generally to an educational mathematical apparatus and more particularly to an educational mathematical apparatus designed and configured to visually and manually enable and encourage students to partake in various mathematical challenges which relate to numbers and to general mathematical processes while providing a fun and enjoyable atmosphere during utilization.

2. Description of the Prior Art

Educational devices, especially those related in the mathematical field, have been used for years for educating and encouraging students in a particular subject matter. These devices are generally designed to provide an alternative form of teaching which is visual and manual, so as to provide for devices which will entice the learning process.

One such device is disclosed in U.S. Pat. No. 4,808,111, issued to Pratt. In this patent there is disclosed a mathematics educating device having a number rack and an operator rack. The number rack includes a plurality of number recesses for receiving a plurality of number plates, wherein each number plate bears a numeral. The operator rack includes a plurality of operator recesses for receiving a plurality of mathematical operators. A practice rack is also disclosed having at least three number practice recesses and at least one operator recess. This will enable the user to remove the place at least two numbers from the number rack into the recesses of the practice rack. The user inserts a desired operator into the operator recess. Upon solving the operation identified in the practice rack, the user inserts the appropriate number plate(s) into the third and/or fourth recess for completion. Though this apparatus does enable individuals to visually and manually determine a particular mathematical process, such as addition, subtraction, multiplication, and division, it does not successfully address other basic fundamental concepts needed to fully understand the essential scope of numbers, processes and primary mathematics. It is seen that Pratt's apparatus does not teach the relative magnitude of numbers, nor the significance of the number zero, as well as fails to teach nor disclose the number base conversion, all necessary concepts needed to excel and conquer mathematics, in all levels.

Yet another mathematical device is disclosed in U.S. Pat. No. 5,423,682, issued to Hildebrandt. In this patent there is disclosed a teaching aid for teaching individuals the process of counting in the tens numbering system. Though successful in this area, Hildebrandt fails to teach the significance of the numeral zero as well as fails to teach basic mathematical operations.

Still another device is disclosed in U.S. Pat. No. 3,357,116 issued to Bazacos, wherein there is disclosed a mathematical teaching device. This device comprises a board having a plurality of pegs extending outwardly therefrom. Centrally located above the pegs are indicias which represent a particular numeral, such as four dots represents the numeral four. The pegs are designed to receive the particular numeral as identified with the indicia. The concept behind this apparatus is a device which will offer a visual means of learning numbers by allowing the user to match the indicia with the particular number. This device is useful for teaching and identifying numbers one through nine; however, this device fails to disclose the concept of zero as well as fails to disclose basic mathematical computation.

One device which does address mathematical computation is disclosed in U.S. Pat. No. 3,290,798 issued to Gilbert. In this patent there is disclosed a teaching device capable of enabling the student to work a variety of problems and answers with relationships by himself. In order to do so, the apparatus includes a first table having a row of mathematical problems and a second table having a plurality of recesses with a mathematical operator located above the recesses. The recesses will accept panels having a numerical representation thereon. This representation signifies the answer identified for the mathematical problem. The recesses are structured so as to accept only one particular panel, and thus immediately allow the user to determine if the answer is correct. Though this device may enable a user to operate the table without supervision, it may inherently teach the individual to recognize shapes rather than basic mathematical concepts, which consequently deters from its intended purpose.

A further device which addresses mathematical computations is disclosed in U.S. Pat. No. 1,396,379 issued to Moore. In this patent there is disclosed a board which slidably receives a plurality of numerical panels and mathematical operators. Located above the numerical representation is an indicia for identifying a particular number. For example, located above numeral two will be two dots. This will enable the user to visually see the numerical number and its particular indicia so as to allow the individual to easily and quickly determine the answer, and slidably insert the correct panel within the board. Though it may assist with counting, by allowing the user to count the indicia, it is questionable as to how beneficial this apparatus performs, since the numerical indicia is constantly shown. Further, this apparatus fails to disclose or teach the concept of zero, nor does this apparatus build an understanding about numbers and their relative magnitude.

Accordingly, it is seen that there exists a need to provide for an educational apparatus which will successfully teach the fundamental areas of mathematics, particularly: the significance and value of the number zero; number base conversions; to build an understanding about numbers and their relative magnitude; and manipulating objects to perform mathematical operations. This educational apparatus should be suited for those with a minimal knowledge of numbers, as well as provide for the learning process to be fun, challenging and exciting.

As will be seen, the present invention achieves its intended purposes, objectives and advantages, by accomplishing the needs as identified above, through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is an educational mathematical apparatus including various embodiments for enhancing the mathematical educational process. In the first embodiment of the present invention, the educational mathematical apparatus includes a base and a singular side of the base is utilized. The base can have an enlarged lower area so as to provide for the base to be a vertically free standing device. Optionally, a stand can be rearwardly located so as to provide for the device to remain in an upright position during utilization. In yet another embodiment, the rear of the base can be located on a flat surface, such as a desk or the like, so as to enable use from the front, and hence eliminate the need for the base to be in a vertical position.

The base includes a front surface, a back surface, and side walls, so as to provide for the base to have a substantially rectangular structure. The front surface includes a plurality of numerical slots or numerical recesses oriented in columns. Each column represents a specific numerical representation (i.e. one's, ten's and hundred's). An operator slot or recess is also provided on the front surface of the base. The orientation of the numerical slots and operator slot will provide for the final appearance to replicate mathematical problems appearing on books and other media.

The numerical slots identified-above, are adapted to slidably and removably receive numerical plates. The numerical plates each include a front surface and a back surface. The front surface includes a numerical representation of a particular number. The back surface may include an indicia that corresponds to the particular number. To aid in the educational process, the plates are sized according to their designated numerical column. For example, a plate designated for a ten's column would be larger in size than a plate designated for the one's column; yet smaller in size than a plate designated for the hundred's column. Thereby, allowing only certain plates to be received in a particular numerical slot of a particular column.

The plate representing zero will be universal for all the numerical slots or recesses. Thereby, providing for the plate(s) representing zero to be insertable into any of the slots regardless of which column it is be received.

The operator plates will include conventional mathematical operator symbols, such as for addition, subtraction, multiplication, and division. The operator symbol will be represented via an indicia. This particular indicia can be located on both the front surface and rear surface, or optionally, on just one surface of the operator plate. It is further noted that the operator slot is universal to the operator plates.

Channels are used to slidably insert the appropriate plate (numerical or operator) into the designated slot. The channels, like the numerical slots, are designed and configured to accept only the appropriate numerical plate for the particular column representation. Hence, the channels for the one's column include a configuration different than that of the ten's column, while the channel for the hundred's column is different in structure than that of the one's and ten's. Accordingly, these plates are inserted into the appropriate slot via the appropriate channel. The channels are located on the appropriate side of the base with respect to the particular column. For example, viewing the base from the front surface, the left side of the base will include a channel for the hundred's column, and in the preferred embodiment, will include channels for the ten's column, while the right side of the base may include channels for the one's column.

It is noted that the slots or openings can extend completely through the base. This will provide for the slots to be through holes so as to provide for both the front and back surfaces to be visual when inserted into the appropriate recess. This visibility will enhance the utilization of the present invention by enabling the user to see numerical representation via the front and illustrative indicia (such as a particular number of dots for a particular number) in the back of the base.

In another embodiment of the present invention, the back surface of the base includes a plurality of outwardly extending pins, to provide for activity to occur via the front or back, or optionally both the front and back of the apparatus. These pins will removably receive an object which represents the numerical value of the respective plate. In this arrangement, the back surface of the numerical plates are hidden. Alternatively, the back surface can be constructed from a transparent material, such as, but not limited to Plexiglas, glass, plastic, or the like, so as to permit for the back surfaces of the plates to be seen and visual from the rear. Optionally, the back surface can be exposed so as to enable the illustrative representation of the particular number to be shown. This may aid in the attachment of the particular object to the particular extending pin. The operator slot can extend to the back surface of the base, so as to allow for the rear surface of the operator plate to be exposed, and hence, seen from the rear surface of the base. Visibility from the rear may be beneficial so as to enable the user to manipulate the objects rather than having to constantly refer to the front surface of the base.

The length of the pins can be sized so as to permit the acceptance of the maximum amount of objects which represents the maximum numerical value for the particular column. For example, the maximum numerical value for the one's column is nine. Hence, if singular blocks were used to represent the value one, then the pin would be of a length which would maintain no more than nine blocks. This will aid the user in understanding and interpreting numbers and numerical magnitude.

Accordingly, it is the object of the present invention to provide for a mathematical apparatus which will overcome the deficiencies, shortcomings, and drawbacks of prior mathematical devices and methods thereof.

Still another object of the present invention is to provide a mathematical apparatus which will provide a means of representing different magnitudes of numbers as well as provide an apparatus which will teach the significance of the number zero.

Yet another object of the present invention is to provide a mathematical apparatus which is capable of teaching number base conversion as well as provide for the same apparatus to manipulate objects to perform mathematical operations.

Still a further object of the present invention, to be specifically enumerated herein, is to provide a mathematical apparatus in accordance with the preceding objects and which will conform to conventional forms of manufacture, be of simple construction and easy to use so as to provide a device that would be economically feasible, long lasting and relatively trouble free in operation.

Although there have been many inventions related to mathematical devices, none of the inventions have become sufficiently compact, low cost, and reliable enough to become commonly used. The present invention meets the requirements of the simplified design, compact sizes low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

FIG. 3a is a perspective front view of a series of plates used with the educational mathematical apparatus of the present invention.

FIG. 3b is a perspective back view of a series of plates, illustrated in FIG. 3a, used with the educational mathematical apparatus of the present invention.

FIG. 4a is a perspective view of the plate representing zero used with the educational mathematical apparatus of the present invention.

FIG. 4b is a perspective view of an operator plate representing a mathematical operator used with the educational mathematical apparatus of the present invention.

FIG. 5 is an example of a series of objects that can be used with the educational mathematical apparatus of the present invention.

Similar reference numerals refer to similar parts throughout the several views of the drawings.

DESCRIPTION OF THE PREFERRED EMBODIMENTS

Figure 1:
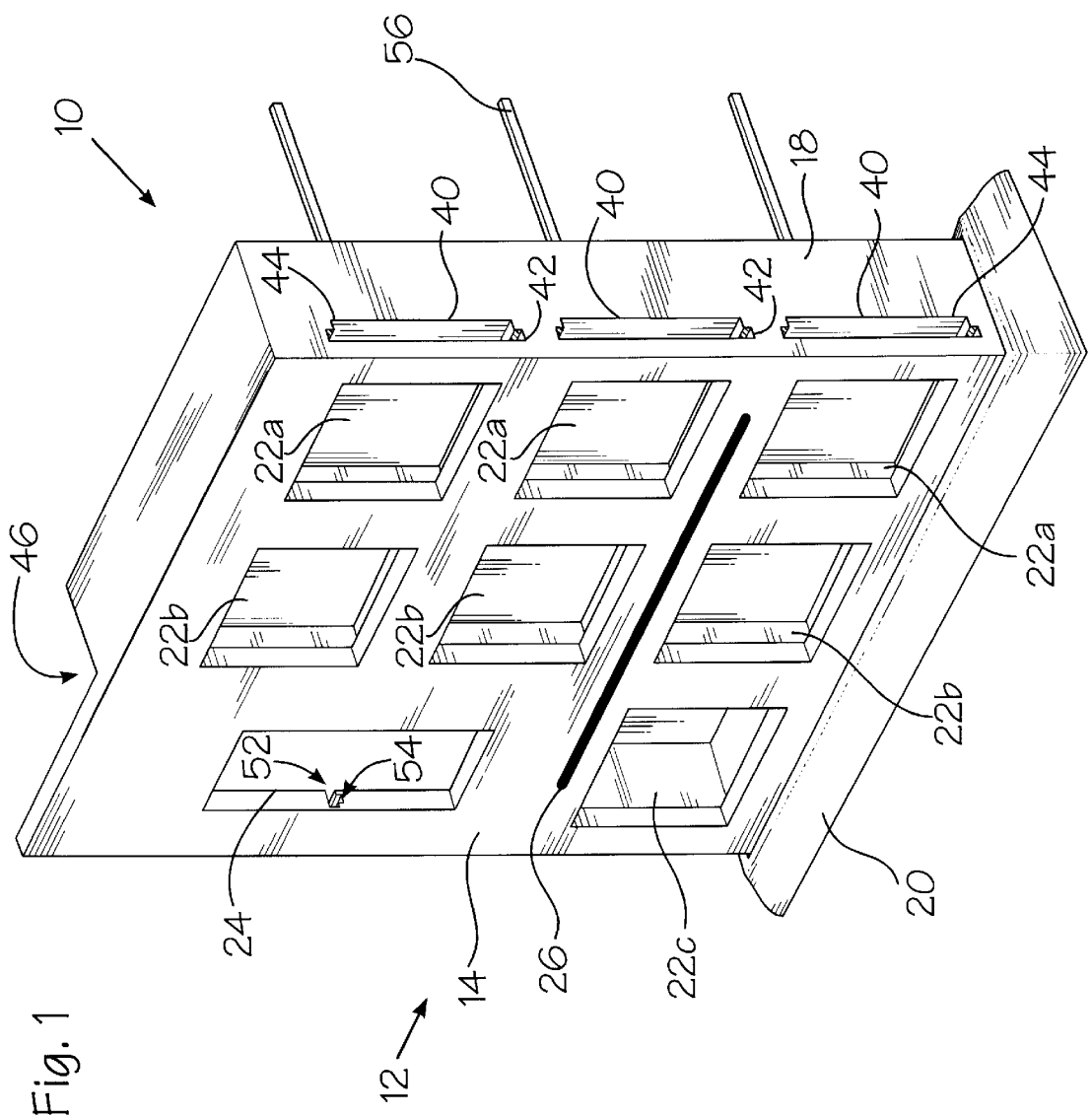
FIG. 1 is a perspective front view of the base used with the educational mathematical apparatus of the present invention having an enlarge lower surface area, for maintaining the base in an upright position.

As seen in the drawings, in particular to FIGS. 1–7 thereof, the present invention, an educational mathematical apparatus, denoted by reference numeral 10, will be described. Shown is an educational mathematical apparatus designed and configured to teach the fundamental areas of mathematics, particularly: the significance and value of the number zero; number base conversions; to build an understanding about numbers and their relative magnitude; and manipulating objects to perform mathematical operations. In order to accomplish the tasks identified above, the apparatus 10 of the present invention includes a base 12. The base 12 is designed to be upright so as to allow for the visibility and accessibility to the front 14 (see FIGS. 1, 6, and 7), back 16 (see FIG. 2) and sides 18 (see FIGS. 1, 2, 6 and 7). This will provide for the overall structure of the base 12 to be substantially rectangular.

Figure 7:
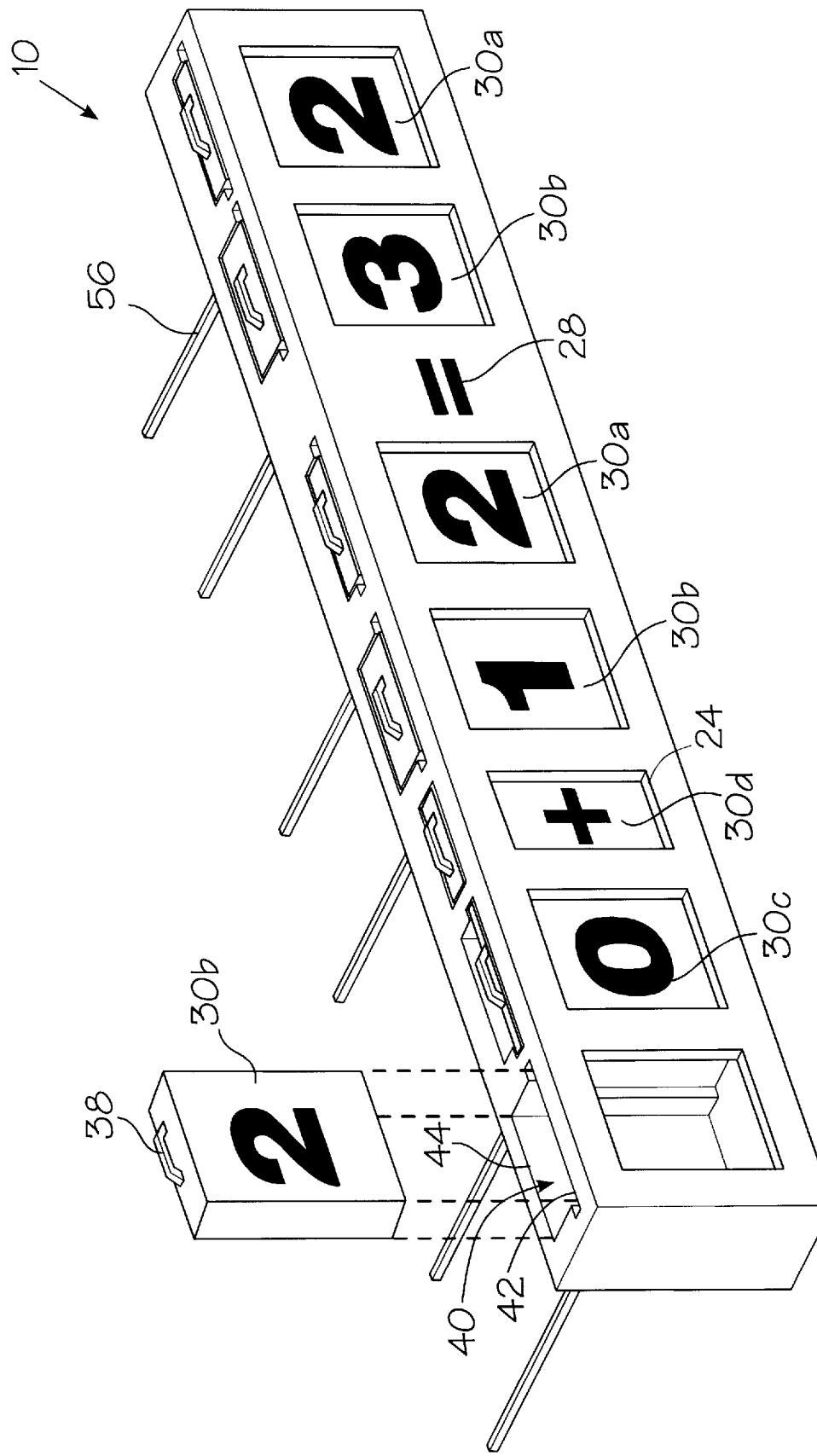
FIG. 7 is an alternative embodiment of the educational apparatus of the present invention having a horizontal configuration.

To allow for the base to remain in an upright position, a conventional stand means 20 is provided. For illustrative purposes, the stand means 20 is shown to be either an enlarged lower portion of the base (see FIG. 1) or can be leg extensions (shown in FIG. 2) extending outwardly and rearwardly from the base. The stand means is provided so as to enable the base to remain in an upright position, while providing for the front 14, back 16 and sides 18 to remain free from any obstructions. It is to be understood by those skilled in the art, that the stand means 20 is a conventional feature, and can be reconfigured within the scope of the present invention, so as to provide for a final base to be free standing as well as being free from obstructions via the front, back and sides. Optionally, the base can be of a significant thickness so as to provide for the base to be free standing, as illustrated in FIG. 7, inherently eliminating the need of a conventional and separate stand means. In yet an optional configuration, the back 16 of the base can rest on a particular surface, such as a desk or table, in order to enable operation to occur via the front 14 and sides 18. This arrangement will eliminate the need for the base to be free standing, vertically.

Figure 2:
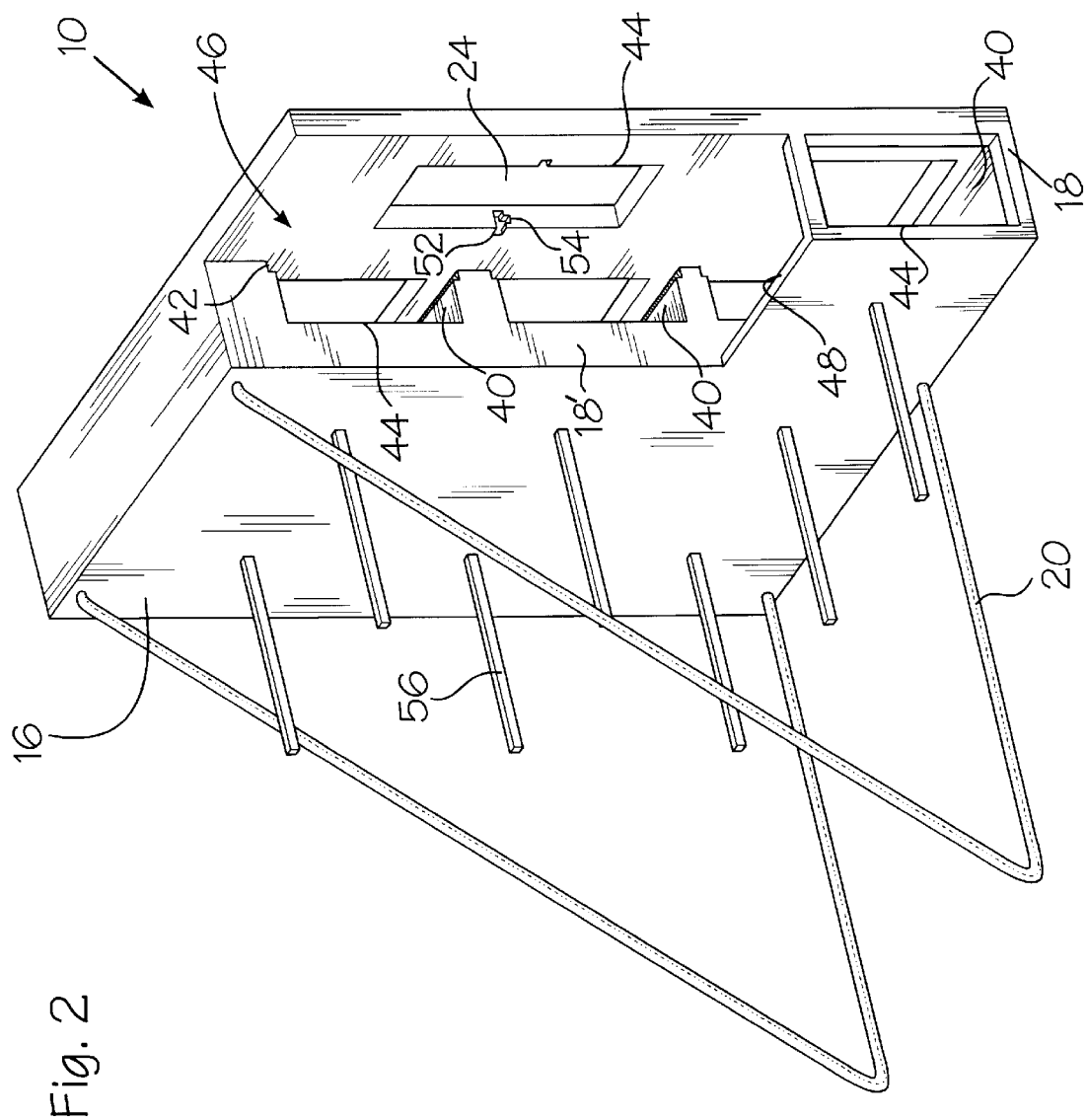
FIG. 2 is a perspective back view of the base used with the educational mathematical apparatus of the present invention and having a stand secured rearwardly thereto, for maintaining the base in an upright position.
Figure 6:
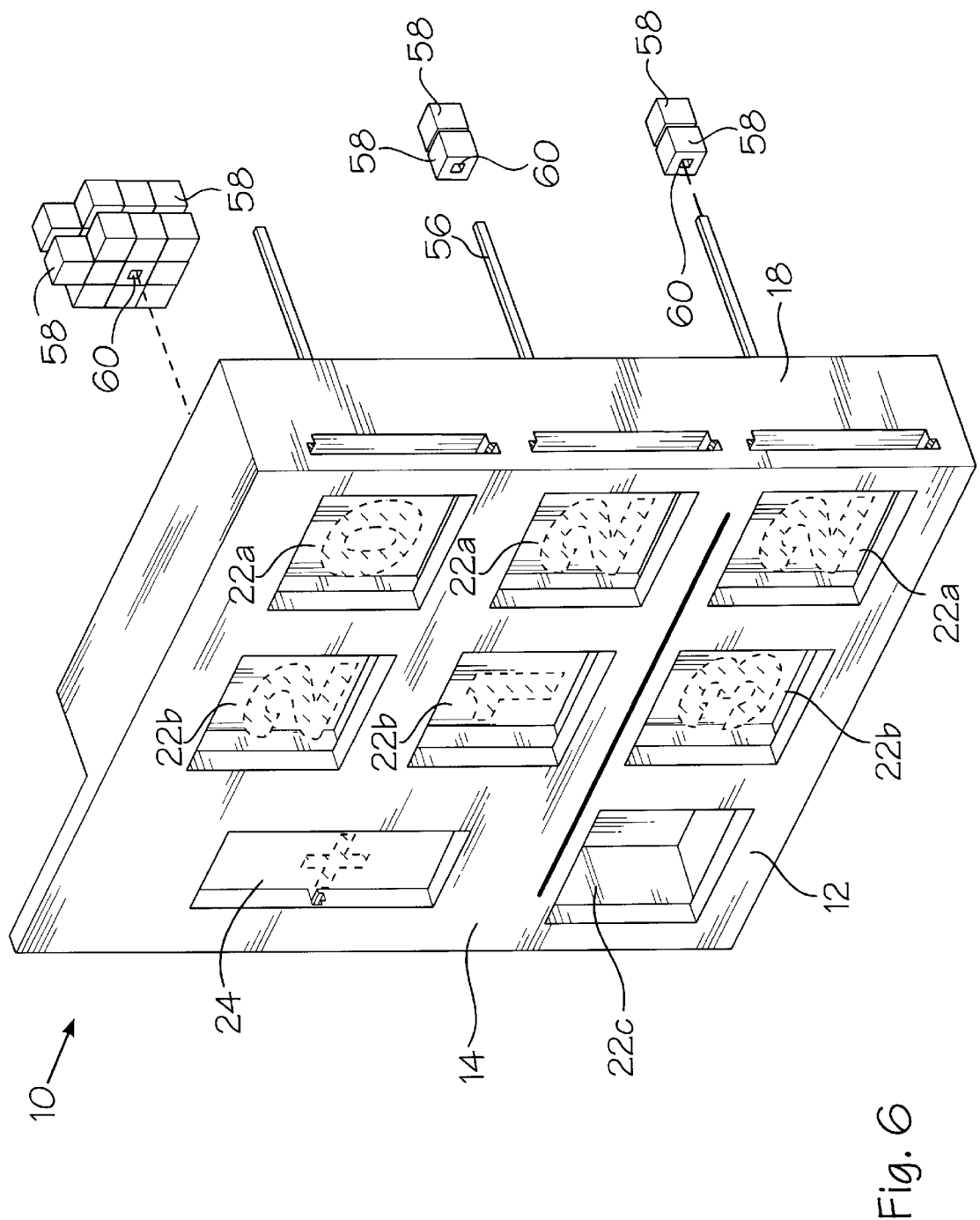
FIG. 6 is an exploded view of the educational mathematical apparatus of the present invention.

As seen in FIGS. 1, 6 and 7, the front surface includes a plurality of numerical slots or numerical recesses 22a, 22b, and 22c. As seen in FIGS. 1 and 6, the numerical slots or numerical recesses are oriented in columns. However, these recesses 22a, 22b, 22c can be disposed in a horizontal configuration, as seen in FIG. 7, so as to provide for an embodiment oriented horizontally. Hence, FIGS. 1, 2, and 6 illustrate a base oriented vertically.

It is noted that the numerical slots or recesses 22a, 22b, and 22c are windows located at the front of the base and is structured so as to enable viewing of the numerical plate. Hence, these windows are substantially identical in shape and size.

Each column, whether in the vertical orientation as shown in FIGS. 1 and 6, or horizontal orientation, illustrated in FIG. 7, represents a specific numerical representation (i.e. one's, ten's and hundred's). As seen in the vertical orientation, the rightmost column, or the column having recesses 22a, represents one's, and each succeeding column, going right to left, will increase in representation so as to provide for the middle column, or the column having recesses 22b, to represent ten's, and the third column, or column having recesses 22c to represent hundred's.

In the horizontal configuration, seen in FIG. 7, a singular row is used for the representation of a mathematical equation. This will consequently provide for numerical values to be represented via a section on the row. A section being defined as a plurality of columns. Each section is separated via an operator, such as a mathematical operator. An operator being an indicia representing addition, subtraction, multiplication, division and/or summation. In each section, the rightmost column represents one's, and each succeeding column, going right to left, will increase in representation. As seen in FIG. 7, facing the front of the base, to the right of the operator representing summation is numeral thirty-two. The rightmost column for this particular section is the numeral two (2) and hence represents the one's. The succeeding column includes a three (3) which is located in the ten's column. Thus the three represents thirty. Though not illustrated, additional columns can be added to each section for this horizontal configuration.

It is noted that FIGS. 1 and 6 illustrate three columns representation (see recesses 22a, 22b, and 22c), while FIG. 7 illustrate two columns representation, however, these figures merely represent a simplified version of the apparatus of the present invention, and it is to be understood that the number of columns can be increased and/or decreased as deemed necessary for any particular environment.

The numerical slots or recesses 22a, 22b, and 22c can partially extend through the front and cease before reaching the back 16, as illustrated in FIG. 2. This will provide for the back to cover and prevent the back surface of the plates from being visual. If visibility of the back surface of the plates is desired, then the back 16 of the base can be fabricated from a transparent material, such as Plexiglas, glass, plastic, or the like. Optionally, to create visibility via the back 16, the numerical slots or recesses 22a, 22b, and 22c can extend through the base to consequently provide for the slots to be through holes and enable viewing of the plates both frontwardly and rearwardly.

An operator slot 24, as seen in FIGS. 1, 2, 6 and 7 can be provided on the base. This operator slot 24, like the numerical slot, can either extend completely through the back, or optionally partially through the base. It is preferred that the operator slot 24 extends completely through the base 12.

To provide for the front of -he base to have the appearance of a mathematical problem, as if it where appearing on books and other media, a line 26, shown in FIGS. 1 and 6, or an equal sign 28, shown in FIG. 7, can be permanently located thereon. The line and/or equal sign will provide a separation between the numbers being address and the answer, and hence may aid in the process of solving for the mathematical problem.

The numerical slots identified above, are adapted to slidably and removably receive numerical plates 30. The numerical plates 30a and 30b, are illustrated in FIGS. 3a, 3b and 7. Each include a front surface 32 and a back surface 34. The front surface 32 includes a numerical representation of a particular number, as seen in FIG. 3a, the front surface includes numeral "2" and numeral "4", respectively. The back surface 34 may include an indicia 36 that corresponds to the particular number. As seen in FIG. 3b, the back surface of the numerical plate representing four includes four dots for its visual indicia. For handling the numerical plates, a handle 38 can be located along its side. For the horizontal configuration, the handles would be located on the top surface of the numerical plate.

For aiding in the educational process, the plates 30a and 30b are sized according to their designated numerical column representation. Hence, as seen in FIGS. 3a and 3b, the plates representing the higher number, in these figures, the plate representing the ten's column, are the same height and length, but are larger in thickness (width) than the plates representing the lower number, in these figures the plate representing the one's column. For example, plate 30a, illustrated in FIGS. 3a and 3b, represents the numeral four for the one's column, to provide for visual and physical representation, this plate is thinner in size than a plate representing a number from ten's category, such as twenty. As seen, plate 30b, is thicker in size than the one's plate, and hence represents a number of greater value. As seen in the FIG. 3b, this plate 30b representation is for the ten's column and hence, the indicia "2" on the front does not represent numeral two, but rather "2" in the ten's column which is equivalent to twenty. Providing for the length and the height to be substantially universal, provides for a final product that is easy to utilize and understand, especially when learning and interpreting the magnitude of numbers.

To further assists in the process of understanding the numbers and their relative magnitude, the receiving means, for receiving the particular plate in the desired recess or window are designed to accept the plate of their particular numerical representation. Thereby, when a particular numerical plate is placed in the base 12, it can only fit in the represented column. For example, the numerical plate 30b represents numeral twenty and hence can only be accepted within the second column from the leftmost side of the base, in the vertical configuration, or the second column from the leftmost side of each section in the horizontal configuration.

In summary, the plate designated for a ten's column would be thicker (wider) in size than a plate designated for the one's column; yet thinner in size than a plate designated for the hundred's column. Thereby, allowing only certain plates to be received in a particular numerical slot of a particular column.

The plate representing zero 30c, is illustrated in FIGS. 4a and 7. This plate is designed and configured to educate the user about the significance of zero, basically, having no value, and as such will be universal for all the numerical recesses. Thereby, providing for the plate(s) representing zero to be insertable into any of the particular recesses regardless of which column it is being received. Since zero represents the smallest value of all the numerical plates, it can be sized and structured to offer visual interpretation of its significance. This sizing will aid and assist the individual to visually see and understand the value of zero. In order to do so, this zero plate 30c, as seen, is structurally the thinnest of all plates, and hence represents the smallest value of all the numerical plates.

To allow for universal insertion, this plate is slightly and marginally larger in height, yet when viewed via the window or recess it will have the same appearance as the other numerical plates. The purpose of altering the height is for the receiving means, which will allow for this particular numerical plate to be universally received in any of the columns. Since the zero has no value, the back surface of each numerical plate representing zero will have no indicia. This plate will have handles located on one or, optionally, both sides, for the vertical configuration of the base (FIGS. 1 and 2) or on the top, for the horizontal configuration of the base (FIG. 7).

A receiving means is provided to enable the plates to be received and viewed via the windows or recesses on the base 12, as seen in FIGS. 1, 2, 6 and 7. The receiving means is basically a channel 40, and includes a unique design and configuration so as to enable a particular numerical plate to be received within its designated column, yet prevent the acceptance of numerical plates which are not directed towards that particular column. For example, the one's plates can only be accepted in the one's column while the hundred's plates cannot be received within the channels designated for the one's column. The zero plate is universal and can be accepted in any and all of the receiving means.

The channel 40 includes a front section 42 and a rear section 44. The front section 42 of each channel being the substantially the same size. Additionally, this front section 42 is marginally taller in height than the rear section 44. Each column includes a designed thickness for the particular numerical plate. As such the total thickness of the front section 42 and the rear section 44 is substantially the same thickness of the particular numerical plate for the designated column.

It is noted that when using the apparatus of the present invention for solving a mathematical equation, the leftmost column in the answer section may not necessarily be utilized. As such, viewing the front surface of the base, in the summation section of the apparatus, the channel for the left most column need not include a front section. Hence, eliminating a need for inserting a zero plate for the leftmost column. This will avoid any unnecessary placement of the zero plate. An example, if adding ten plus ten, for the apparatus as illustrated in FIG. 1, the answer would be twenty or a "2" in the ten's column and a "0" in the one's column. An additional zero need not be located in front of the "2" or in the hundred's column. This elimination of the increased height in the front section is optional, yet preferred for the leftmost column in the summation area of the apparatus of the present invention.

The rear section 44 of each column is designed and configured to be of a different thickness. In the preferred embodiment, the rear section will increase in size, as the column's increase in value. Thereby, the rear section of the one's column is thinner in size than the rear section of the ten's column. The rear section of the hundred's column is thicker than the rear section of the ten's column. Yet the front section of the one's column, ten's column and hundred's column are substantially the same size.

Accordingly, the numerical plate representing zero is universally received within the front section 42 of each receiving means or channel 40. The combined thickness of the front section and rear section of each channel will receive the thickness of the numerical plate for the particular column numerical representation. It is noted that the channels are larger in size than the windows or recesses, and thus the channels in combination with the windows or recesses inherently provide for a retaining means for retaining the particular numerical plate in a fixed position within the base. The windows or recesses, in combination with the channels provides for an accepting means for accepting, retaining and viewing the particular plate within its respective location. It is noted the structure of the receiving means or channels as well as the structure and configuration of the plates can be altered and changed, by one of ordinary skill in the art, so as to provide for a final product which will successfully and adequately represent the magnitude of a particular number as well as the acceptance of a particular number within a particular column. For example, the tiles can increase in length and height, as opposed to width. The channels would be altered accordingly.

The channels are located on the appropriate side of the base with respect to the particular window. As seen in FIGS. 1, 2, and 6, the vertical orientation, the various channels are located along the sides 18 of the base. To allow for insertion in the middle column, the back 16 of the base 12 includes a cut-away portion 46. This cut-away portion 46 allows for a side wall 18' to be located next to the middle column and enables the operator slot to be accessible. Additionally, this cut-away provides for the channel for the hundred's column to be located on the side wall 18 and also provides for an inherently formed top wall 48. Located in this top wall in a channel which will receives plates directed and geared towards second column for the summation row or section. As illustrated in FIG. 7, the vertical orientation, the various channels are located on the top of the base.

Hence, as seen in FIGS. 1, 2, 6 and 7, the channels are sized in accordance with its location on the base. Thereby, the numerical channels for the rightmost column, or column containing recesses 22a, are thinner in size than the succeeding column. This will provide for channels used for enabling insertion of numerical plates to be viewed via recesses 22b to be thicker in size than channels used for enabling viewing to occur via recesses 22a, but thinner in size for the channels used for recess 22c, if provided. In summary rendering for the channels to increase in thickness as the columns increase in value of numerical representation.

Operator plates 30d are received within the operator slot 24. These plates include indicia for representing conventional mathematical operator symbols, such as for addition (+), as illustrated in FIG. 4b, subtraction (−), multiplication (×), and division (÷ or /). The indicia for the particular operator symbol can be located on both the front and rear surfaces of the plate. Optionally, two operator symbols can be used on a single operator plate. For example, one side can include the symbol for addition while the opposite side can include the symbol for subtraction.

When used in the vertical configuration, as shown in FIGS. 1, 2, 4b and 6, extending outwardly from each side of the operator plate is a flange 50. This flange 50 is used to insert the operator plate 30d into an accepting means of the operator recess and is also used to maintain the operator plate in a fixed and secured position. A handle (not illustrated) can be located on the back surface of the operator plate. It is noted that in the horizontal configuration, as seen in FIG. 7, flanges are not used and a handle is located on the top surface of the operator plate.

The accepting means or retrieving means for the operator plate is shown in FIGS. 1 and 2 for the vertical configuration. As seen, the retrieving means includes a horizontally oriented slot 52. Extending downwardly and centrally from the slot is a groove 54. The slot receives the flange 50 of the operator plate 30d and it is locked into a fixed position when the user pushes the plate down so as to permit for the flange to be inserted into the groove 54.

To further aid in the visual aspect and provide more "hands-on" experience with basic mathematical concepts, other indicia can be removably secured to the back surface 16 of the base 12. In order to enable this type of configuration, a plurality of pins 56, as seen in FIGS. 1, 2, 6 and 7 extend outwardly from the back surface of the base. The pins 56 are located in proximity to each numerical recesses. These pins 56 will removably receive a/several object/objects 58 which represents the numerical value of the respective plate. Examples of the objects 58 are illustrated in FIGS. 5 and 6. As seen in these figures, the objects 58 are blocks which represent a particular number. The blocks are arranged in either one's configuration, ten's configuration or 100's configuration. Accordingly, in the example shown in FIGS. 5 and 6, if numeral two where represented on the plate, then two "one" blocks would be inserted onto the particular pin. If numeral twenty where represented on the plate, then two "tens" block would be inserted onto the particular pin. To be maintained on the pin 56, apertures 60 extend through the objects 58. It is to be understood, that FIGS. 5 and 6 merely illustrate an example of one indicia means which can be used for numerical representation, and that it is within the scope of the present invention, for one of ordinary skill in the art, to alter this embodiment, so as to provide for any relatively reasonable structure to represent one's, ten's and hundred's.

The length of the pins can be sized so as to enable the acceptance of the maximum amount of objects which represents the maximum numerical value for the particular column. For example, the maximum numerical value for the one's column is nine and the maximum numerical value for the ten's column is ninety. Hence, if singular blocks were used to represent the value one, then the pin for the one's column would be of a length which would maintain no more than nine blocks for representing the numerical value nine. For the tens column, if ten blocks were coupled into forming a singular object for representing the numerical value ten, then the length for the pin of the ten's column would be of a length which would accept no more than nine objects. Thereby, providing each of the pins to include substantially the same length.

In summary, the present invention is an educational apparatus which will successfully teach the fundamental areas of mathematics, particularly: the significance and value of the number zero; number base conversion; to build an understanding about numbers and their relative magnitude; and manipulating objects to perform mathematical operations.

By providing a universal plate for the representation of the number zero, the user will learn that zero has no numerical value. Using blocks or other indicia which are presented in one's, ten's and hundred's inherently enable a learner number base conversions. By having pin lengths which enable the acceptance of the maximum amount of objects which represents the maximum numerical value for the particular column will allow the user to learn that the maximum number you can have in any column does not exceed the highest value for that particular column. Having numerical plates with thickness that increase with increase value enables an individual to visually see the numerical magnitude. Including mathematical operators in combination with the numerical plates will consequently allow for the user to perform mathematical operations. Hence, it is seen that the present invention is a useful and challenging product which has a multiplicity of uses.

The back can be used alone for teaching number base conversions. The channels and numerical plates can be used alone for teaching the significance and value of zero, number base conversion, and to build the understanding about numbers and their relative magnitude. The operator plate, used in combination with the channels and numerical plate will enable mathematical operations to be performed. The pins and attachable indicia can be used as a means of determining if the answer supplied on the front of the base for the mathematical operator was performed correctly. Thereby providing an overall apparatus which will enable the user to operate it alone or with the assistance of an adult. Either way, the final product is one where the various mathematical challenges which relate to numbers and to general mathematical processes are performed in a fun, enjoyable and yet, educational environment.

As seen, the final product in the vertical configuration, as seen in FIGS. 1, 2 and 6, will include a plurality of columns and at least one row. When used for mathematical computation, the apparatus 10 of the present invention will have at least three rows, wherein one row will signify the answer row. In a preferred embodiment, this answer row will include at least one additional column which is not represented or included in the previous rows.

In the horizontal configuration, as seen in FIG. 7, the present invention will include a singular row having a plurality of sections. Each section including at least two columns and being separated via an operator symbol. One section will represent the answer section and this answer section can include at least one additional column than the previous sections.

In yet an alternative embodiment, the base 12, can be simplified by eliminating the channels. Indicias, such as rectangular markings or recesses can be provided on the front surface of the base. The indicias or recesses will receive the plates (numerical and/or operator).

In this embodiment the base can be fabricated from a material exhibiting magnetic characteristics or can be fabricated from a metallic material. The plates (numerical and operator) can be fabricated from metallic material (if the base is fabricated from a magnetic material), a magnetic material, or optionally can include a magnetic material attached thereto or embedded therein. This will allow for the plate(s) to be magnetically received and secured onto the front surface of the base. Such an arrangement will simplify the final product and will allow for easy attachment and removal of the plates to and from the base. The magnetic attraction of the base to the plates in combination with the indicias (markings or recesses) provide for an accepting means. The accepting means enables the plates to be received and adequately displayed on the front surface of the base.

The embodiment described above can be simplified, to provide for an apparatus which can easily and efficiently be used on a flat surface, such as a floor, desk, table or the like. In this arrangement, the base is provided with recesses, and the channels and pins are eliminated. Hence, in this simplified version, the user inserts the plates (numerical and/or operator) into the appropriate recess for operation. The recesses represent the accepting means.

Optionally, and in yet another form of the present invention, the embodiment described above, can be altered by providing for the base and plates to be fabricated from materials, or embedded with materials which exhibit magnetic attraction. This will ensure that the plates are maintained within the appropriate recesses.

EXAMPLES OF USES

The final product is an apparatus which can be configured so as to allow for optimum use and versatility on every mathematical level. Having all the elements as disclosed and illustrated in FIGS. 1, 2, and 7 and provides a device which will enable continuous use, even as the individual becomes more and more educated in the mathematical area. Various components as illustrated and described can be selectively eliminated or included to provide an apparatus which is beneficial and geared to a particular area or areas in the mathematical arena.

Example 1

The base can include a plurality of windows oriented in columns and at least one row. No mathematical operator is provided. Thereby, looking at the front of the base, the column will increase in numerical value from right-to-left. Channels and windows, as defined above, will be sized according to column location and orientation. This will provide an apparatus which will successfully educate the value of the number zero, number base conversion, and to build an understanding about numbers and their relative magnitude.

Example 2

The base can include a plurality of windows oriented in columns. The columns can be oriented in a singular row, as illustrated in FIG. 7, or can have a plurality of rows, as illustrated in FIGS. 1 and 2. A mathematical operator is provided. An indicia representing an "equal sign" is provided on the base. Channels and windows, having substantially the same size for each column, are coupled to each window. Numerical plates and mathematical operators are removably inserted into the channel for viewing via the windows. Such an arrangement will enable an individual to perform mathematical computations.

Example 3

The base as defined in example two is provided and further includes a plurality of pins extending outwardly from rear surface. The pins correspond to each numerical window located on the front surface. Objects are removably attached to the pins. The objects correspond to the numerical representation of each numerical plate. The user can then attach the appropriate object, or the appropriate number of objects, to the particular pin for the represented numerical value of the particular numerical plate. The use of objects, in addition to the use of numerical plates, may be beneficial in the understanding and the interpretating of the value of the number zero, number base conversion, and building an understanding about numbers and their relative magnitude.

Example 4

The base includes a front surface and a rear surface. A plurality of recesses are located on the front surface. The recesses are oriented in columns. The columns can be oriented in a singular row, as illustrated in FIG. 7, or can have a plurality of rows, as illustrated in FIGS. 1 and 2. A mathematical operator is provided. An indicia representing an "equal sign" is provided on the base. Numerical plates and operator plates are removably inserted into the recesses. To operate, the user places the rear surface on a flat structure, such as a desk. The desired numerical plates are inserted into the appropriate numerical recesses. The desired mathematical operator plate is inserted into the desired operator recess. The mathematical problem is performed. This configuration will enable the individual to perform mathematical computations.

While the invention has been particularly shown and described with reference to an embodiment thereof, it will be understood by those skilled in the art that various changes in form and detail may be made without departing from the spirit and scope of the invention.

I claim:

1. A mathematical apparatus comprising:
   a base having at least a front surface;
   a first set of numerical plates;
   a second set of numerical plates;
   an accepting device being oriented in at least a two column configuration and at least a one row configuration;
   said first set of numerical plates being removably secured to said accepting device for viewing and receiving said first set of numerical plates via said front surface of said base and via a first column;
   said second set of numerical plates being removably secured to said accepting device for viewing and receiving said second set of numerical plates via said front surface of said base and via a second column;
   each of said numerical plates from said first set being substantially the same size in height and width and each of said numerical plates from said second set being substantially the same size in height and width;
   said first set of numerical plates having a first size and said second set of numerical plates having a second size;
   said first size of said first set of numerical plates having a different thickness than said second size of said second set of numerical plates;
   said first set of numerical plates represents one's and said second set of numerical plates represents ten's; and
   each of said first set of numerical plates includes only a singular numerical digit;
   each of said second set of numerical plates includes only a singular numerical digit;
   wherein said first column represents one's and said second column represents ten's so as to provide a means of educating a relationship between numbers and their relative magnitude.

2. A mathematical apparatus as in claim 1 further comprising at least one numerical plate representing zero and said at least one numerical plate representing zero is insertable into said accepting means corresponding to any row in said first column and said second column, respectively, so as to provide for each numerical plate representing zero to be universal to each of said columns.

3. A mathematical apparatus as in claim 1 wherein at least three rows are provided on said base, an operator recess on said front surface of said base and above a lower most row of said base, and a plurality of operator plates, each bearing a different mathematical operator symbol, is removably secured to said operator recess.

4. A mathematical apparatus as in claim 3 wherein said mathematical operator symbol is selected from the group consisting of addition, subtraction, multiplication, and division.

5. A mathematical apparatus as in claim 1 wherein each of said numerical plates include a front surface and a rear surface, said front surface includes a numerical value, and said rear surface includes a quantity indicia corresponding to said numerical value located on said front surface.

6. A mathematical apparatus as in claim 5 wherein said numerical plates include a holding device for enabling easy removal and insertion of said numerical plates into and out of said accepting device.

7. A mathematical apparatus as in claim 1 wherein said base includes a rear surface and a plurality of pins extend outwardly from said rear surface of said base and are located oppositely from each accepting means, a plurality of objects are removably secured to said pins, said objects correspond to numerical representation of said numerical plate which is removably received within each accepting means.

8. A mathematical apparatus as in claim 7 wherein said plurality of pins are sized so as to enable the acceptance of a maximum amount of objects which represents the maximum numerical value for a particular column.

9. A mathematical apparatus as in claim 1 wherein said accepting device for each column is sized differently for providing for said accepting device representing one's to be different in size than said accepting device representing ten's, and said accepting device for representing one's can only accept numerical plates from said first set.

10. A mathematical apparatus as in claim 1 wherein said base further includes a third column which represents 100's and having a separate accepting device, a third set of numerical plates are removably secured to said separate accepting device, each of said numerical plates from said third set being substantially the same size in height and width, said third set having a third size, and said third size of said third set of numerical plates being sized differently from said first size of said first set of numerical plates and said third size of said third set of numerical plates being sized differently from said second size of said second set.

11. A mathematical apparatus as in claim 3 wherein an equal indicia is located above said lower most row for replicating a mathematical problem.

12. A mathematical apparatus as in claim 3 wherein said accepting device comprises a window and a channel, said window is located on said front surface of said base and said window is substantially the same size within each column, said channel enables said first set of numerical plates and said second set of numerical plates to be viewed via window, said channel comprises a front section and a rear section, said front section being substantially identical in size with respect to each column, said rear section being sized differently per column, at least one numerical plate representing zero is provided, said at least one numerical plate representing zero is insertable into said front section of either said first column and said second column, respectively, so as to provide for each numerical plate representing zero to be universal to each of said columns.

13. A mathematical apparatus as in claim 12 wherein said base further includes a rear surface and a plurality of pins extend outwardly from said rear surface of said base and are located oppositely from each accepting means, a plurality of objects are removably secured to said pins, said objects correspond to numerical representation of said numerical plate which is removably received within each accepting means.

14. A mathematical apparatus as in claim 1 wherein said accepting means includes recesses and said first set of numerical plates and said second set of numerical plates are magnetically received and secured within said recesses.

15. A mathematical apparatus comprising:
   a base having at least a front surface;
   a first set of numerical plates;
   a second set of numerical plates;
   an accepting device being oriented in a singular row configuration and including at least three sections; each section includes at least two columns;
   a separating device separates each section from each other;
      said first set of numerical plates being removably secured to said accepting device for viewing and receiving said first set of numerical plates, via said front surface of said base and via a first column of each of said sections;
      said second set of numerical plates being removably secured to said accepting device for viewing and receiving said second set of numerical plates via said front surface of said base and via a second column of each of said sections;
      each of said numerical plates from said first set being substantially the same size in height and width and each of said numerical plates from said second set being substantially the same size in height and width;
   said first set of numerical plates having a first size and said second set of numerical plates having a second size;
   said first size of said first set of numerical plates having a different thickness than said second size of said second set of numerical plates;
   an operator recess being located on said front surface of said base and between two sections;
   said operator recess constitutes a separating means;
   a plurality of operator plates, each bearing a different mathematical operator symbol, is removably secured to said operator recess;
   each of said first set of numerical plates includes only a singular numerical digit;
   each of said second set of numerical plates includes a singular numerical digit;
   wherein said first column of each section represents one's and said second column of each section represents ten's, so as to provide a means of educating in mathematics and providing a relationship between numbers and relative magnitude.

16. A mathematical apparatus as in claim 15 wherein an equal indicia is located between a middle section and a last section, said operator recess and said equal indicia constitute said separating device, and said equal indicia enables replication of a mathematical problem.

17. A mathematical apparatus as in claim 16 wherein said base further includes a rear surface and a plurality of pins extend outwardly from said rear surface of said base and are located oppositely from each accepting means, a plurality of objects are removably secured to said pins, said objects correspond to numerical representation of said numerical plate which are removably received within each accepting means.

18. A mathematical apparatus as in claim 17 wherein said plurality of pins are sized so as to enable the acceptance of a maximum amount of objects which represents the maximum numerical value for a particular column.

19. A mathematical apparatus as in claim 15 further comprising at least one numerical plate representing zero and said at least one numerical plate representing zero is insertable into said accepting means corresponding to said first column and said second column of each section, respectively, so as to provide for each numerical plate representing zero to be universal to each of said columns.

20. A mathematical apparatus as in claim 15 wherein said accepting device for each column of each column is sized differently for providing for said accepting device representing one's of each section to be different in size than said accepting device representing ten's of each section, and said accepting device for representing one's can only accept numerical plates from said first set.

* * * * *